Jan. 11, 1927.  1,613,891
C. J. HIMEL
SIGNAL LIGHT SWITCH
Filed March 25, 1925   2 Sheets-Sheet 1
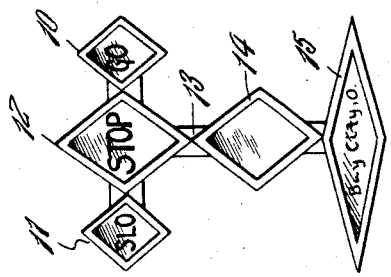
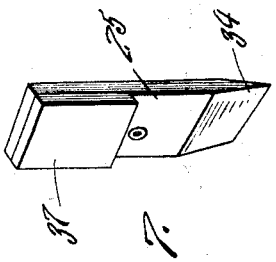
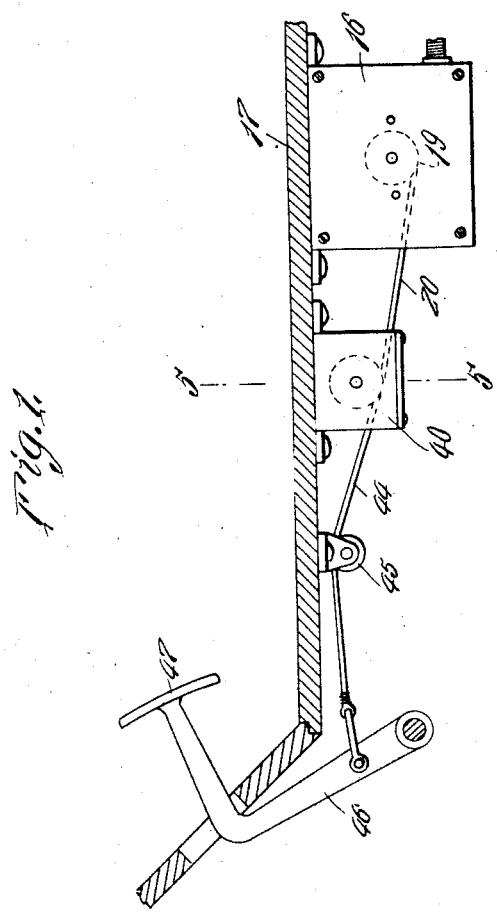
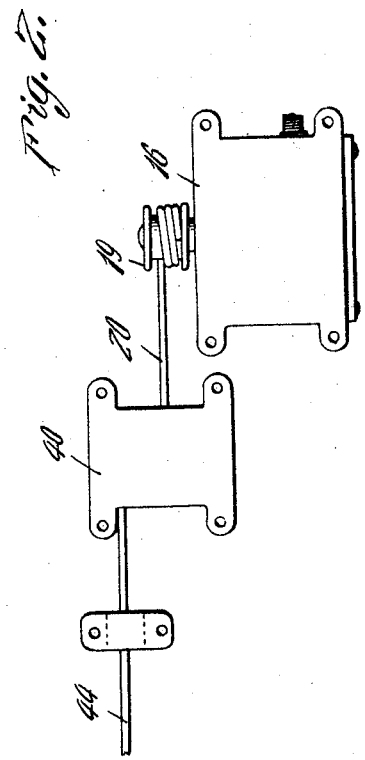
C. J. Himel
INVENTOR
BY Victor J. Evans
ATTORNEY Jan. 11, 1927.
C. J. HIMEL
1,613,891
SIGNAL LIGHT SWITCH
Filed March 25, 1925    2 Sheets-Sheet 2
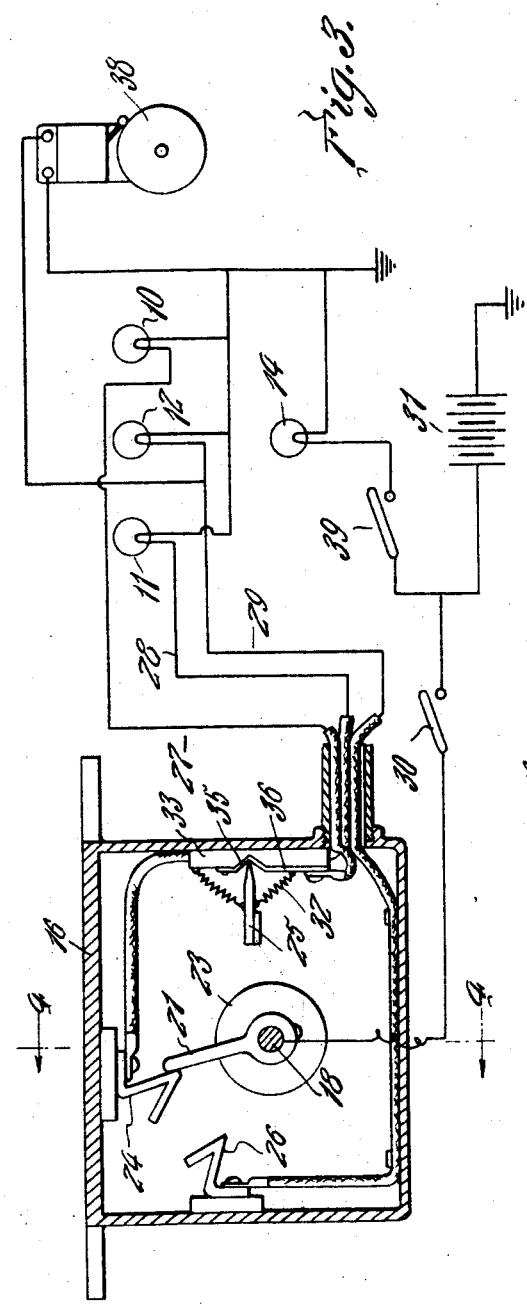
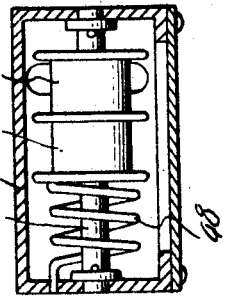
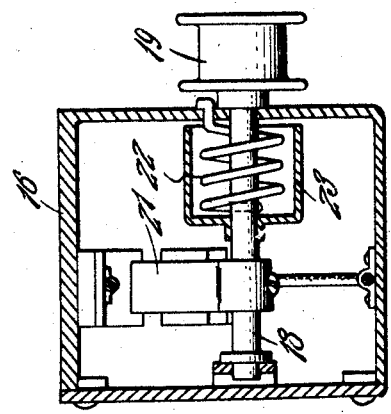
C. J. Himel —
INVENTOR
BY Victor J. Evans
ATTORNEY Patented Jan. 11, 1927.

1,613,891

UNITED STATES PATENT OFFICE.

CURTIS JOSEPH HIMEL, OF NEW ORLEANS, LOUISIANA.

SIGNAL-LIGHT SWITCH.

Application filed March 25, 1925. Serial No. 18,312.

This invention relates to indicating signals for motor operated vehicles, and more particularly to a switch construction adapted to be operated by one of the control pedals of the vehicle, to selectively operate one of a plurality of indicating signals which may be mounted on any appropriate part of the vehicle.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation of the signal operating means showing how the same is mounted on the floor board of a vehicle and connected with one of the control pedals.

Figure 2 is a top plan view.

Figure 3 is a diagrammatic view showing the switch box in section.

Figure 4 is a sectional view on line 4—4 of Figure 3.

Figure 5 is a sectional view on line 5—5 of Figure 1.

Figure 6 is a view in elevation of the various signals.

Figure 7 is a perspective view of one of the contacts.

Referring to the drawings in detail, 10, 11 and 12 represent a plurality of indicating signals included in normally open circuits, any one of which can be closed independently of the other, to call into use the particular signal desired. These signals may be grouped upon a suitable support as shown in Figure 6, or they may be arranged upon any appropriate part of the vehicle with which they are used. The signal 10 has the word "Go" on the face thereof, the signal 11 being provided with the word "Slow", while the signal 12 is used as a "Stop" signal as shown in Figure 6. These signals are preferably arranged upon a suitable bracket or support 13 upon which is also mounted the tail light 14 and a plate 15 which may be utilized for various purposes or as a license tag holder, or a plate upon which may be arranged the name of the city or residence of the owner of the vehicle. The particular construction and arrangement of these various signals is of no particular importance, as the gist of the present invention resides in the provision of a switch construction which may be used to selectively operate the signals in a manner to be hereinafter described.

This switch includes a switch box 16 which is adapted to be secured to the underside of the floor board 17 of the vehicle, while journalled in said box is a shaft 18. This shaft projects beyond one side of the box 16 and supports a pulley wheel 19 with which a cable 20 is associated to be wound about or unwound therefrom. The shaft 18 supports a movable contact arm 21 which is adapted to rotate with the shaft to singly engage one of a plurality of fixed contacts disposed in the path of movement of the said arm. Surrounding the shaft 18 is a coiled spring 22 which has one end secured to the shaft and the other end attached to the adjacent wall of the box 16; the spring influences the shaft 18 to normally hold the latter and the contact arm 21 in the position shown in Figure 3. A suitable casing or housing 23 is supported by the shaft 18 and encloses the spring 22.

Supported upon the walls of the box 16 is a plurality of fixed contacts, one for each support for the various signals above described, and these contacts are indicated at 24, 25 and 26 respectively. The contact 24 is included in the circuit with the signal 10, the wire for said circuit being indicated at 27, while the contact 25 is included in the circuit for the signal 11, the wire of which is shown at 28. The contact 26 is included in the circuit with the signal 12, the wire for which is shown at 29. Included in all of these circuits is a manually operable switch indicated generally at 30 in Figure 3, which must of course be closed before any of the circuits above described can be operated. The source of current is indicated at 31, while the switch 30 is adapted to be mounted upon the switch board within convenient reach of the operator. As shown in Figure 3, the contact arm 21 normally engages the contact 24 of the circuit to the signal 10, but the circuit of course is not closed to operate the signal unless the switch 30 is closed to complete the circuit. When the shaft 18 is rotated in a manner to be presently described, the contact arm 21 successively engages the contacts 25 and 26, thus operating the signals 11 and 12 in order. In order to allow the contact arm 21 to pass beyond the contact 25, the latter is supported by a flexible element 32 preferably coiled springs which have their adjacent ends secured to the contact 25 in the manner shown in Figure 3, and the other ends attached to the block 33 mounted upon the adjacent wall of the switch box 16. This contact 24 has one end tapered as at 34, the tapered extremity being received by a V-shaped depression 35 in a metallic plate 37 secured to one face of the block 33. This construction provides for the pivotal movement of the contact 25, so that it can be moved in either direction against the tension of either spring, depending upon the direction of rotation of the shaft 18. When the shaft is rotated in a clockwise direction, the arm 21 engages the contact 25 to close the circuit to the signal 11, but when the shaft is being rotated in a counter-clockwise direction, during the return movement of the arm 21 to its normal position, the said arm strikes a piece of insulated material 37 secured to the underside of the contact 25, so as not to close the circuit to the signal 11. The springs 32 of course maintain the contact 25 in the position shown in Figure 3, and obviously return the contacts to this position after each operation. Also included in the circuit of the stop signal 12 is an audible signal such as a bell or the like indicated generally at 38, and this signal is sounded simultaneously with the illumination of the signal 12. The tail light 14 is arranged in a circuit including a manually operable switch 39 so that it may be independently operated. Secured to the underside of the floor board 17 is a casing 40 which is arranged adjacent the switch box 16, and in which casing is journalled a shaft 41. Supported by this shaft are pulleys 42 and 43 respectively which are constructed as a unit; the cable 20 from the pulley 19 above referred to being associated with the pulley 42. A second cable 44 is associated with the pulley 43, being trained over an idler 45 depending from the floor board of the vehicle and having its free end connected with the shank 46 of the brake pedal 47 of the vehicle. Surrounding the shaft 41 is a coiled spring 48, one end of which is secured to the pulley 43, while the other end is attached to the casing 40. This spring normally holds the cables 20 and 44 wound about the pulleys 42 and 43 in a manner to maintain the control pedal 47 in the position shown in Figure 1.

In practice, the vehicle is operated in the usual well known manner, and as long as the switch 30 remains open the brake pedal 47 can be operated without effecting any of the signals above described. However, it is intended to initially close the switch 30, whereupon the signal 10 is called into use while the brake pedal 47 occupies its normal position, this because of the fact that the arm 21 normally engages the contact 24. Consequently, the signal 10 will indicate to others that the vehicle is about to start, or if in motion to continue to move in a forward direction. When it is desired to check the speed of the vehicle, the brake pedal 46 is partly depressed in the usual manner, whereupon the shaft 18 is rotated to bring the arm 21 into engagement with the contact 25. When the arm 21 moves away from the contact 24 the circuit to the signal 10 is broken, and when it engages the contact 25 the circuit to the signal 11 indicating "Slow" is closed. If it is necessary to bring the vehicle to a stop, the brake pedal is fully depressed, and during the continued downward movement of the said pedal, the shaft 18 is further rotated in the same direction, bringing the arm 21 into engagement with the contact 26. As the arm 21 passes away from the contact 25, the latter is moved pivotally in the manner above described and against the tension of one of the springs 32, and when the arm 21 is wholly separated from the said contact 25, the latter is automatically returned to its normal position through the instrumentality of the same spring. Now, when the arm 21 is brought into engagement with the contact 26, the circuit to the signal 12 is closed, and the signal 38 simultaneously sounded, thereby indicating to others that the vehicle is about to be brought to a stop. When the brake pedal 47 is released, the springs 22 and 48 above described reverse the direction of rotation of their respective shafts, whereby the mechanism is returned to a normal position. It is during this direction of rotation of the arm 21 that the latter engages the insulated piece 37 carried by the contact 25, so that the signal 11 will not be unnecessarily operated.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A switch of the character described comprising a casing, a pair of spaced stationary contacts arranged therein, a shaft journaled within the casing, means for rotating the shaft in one direction, a contact arm carried by the shaft and adapted to singly engage said fixed contacts, a block supported within the casing and having a metallic side formed with a V-shaped depression, an additional contact having a bevelled edge received by said depression, whereby said last mentioned contact is supported for pivotal movement to allow the contact arm carried by the shaft to move in either direction past the pivoted contact, coil springs terminally connected with said block and to the opposite sides of the pivoted contact for returning the latter to normal position after being moved by the contact on said shaft, and a coil spring surrounding said shaft and having one end connected thereto, and its other end connected with said casing for returning the shaft to its normal position after each operation of the switch.

In testimony whereof I affix my signature.

CURTIS JOSEPH HIMEL.